(12) United States Patent
Ono (10) Patent No.: US 8,908,963 B2
(45) Date of Patent: Dec. 9, 2014

(54) IMAGE PROCESSING APPARATUS, IMAGE PROCESSING METHOD, AND PROGRAM

(71) Applicant: Seiko Epson Corporation, Tokyo (JP)

(72) Inventor: Satoru Ono, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 13/771,417

(22) Filed: Feb. 20, 2013

(65) Prior Publication Data

US 2013/0216132 A1    Aug. 22, 2013

(30) Foreign Application Priority Data

Feb. 21, 2012  (JP) ................. 2012-034858

(51) Int. Cl.
*G06K 9/00* (2006.01)
*G09G 5/02* (2006.01)
*G06K 9/46* (2006.01)
*H04N 1/52* (2006.01)

(52) U.S. Cl.
CPC ............. *G06K 9/4652* (2013.01); *H04N 1/52* (2013.01)
USPC .......................................... 382/165; 345/593

(58) Field of Classification Search
CPC .................. G06K 9/4652; H04N 1/52
USPC ................. 382/165, 181; 345/593, 603, 604
See application file for complete search history.

(56) References Cited

U.S. PATENT DOCUMENTS

| 7,266,661 B2* | 9/2007 | Walmsley ...................... 711/164 |
| 7,916,152 B2* | 3/2011 | Jones et al. ................... 345/589 |
| 8,400,533 B1* | 3/2013 | Szedo et al. .................. 348/241 |
| 8,477,150 B2* | 7/2013 | Inuzuka ....................... 345/604 |
| 2011/0058200 A1 | 3/2011 | Miyahara et al. |
| 2011/0229023 A1 | 9/2011 | Jones et al. |

FOREIGN PATENT DOCUMENTS

| EP | 0 446 008 A2 | 9/1991 |
| EP | 2 175 414 A1 | 4/2010 |
| JP | 2008-077307 A | 4/2008 |
| JP | 2008-235965 A | 10/2008 |

OTHER PUBLICATIONS

Extended European Search Report dated May 17, 2013 as received in application No. EP 13 15 5599.

* cited by examiner

*Primary Examiner* — Kanjibhai Patel
(74) *Attorney, Agent, or Firm* — Maschoff Brennan (57) ABSTRACT

An image processing apparatus for applying to a color image a pattern corresponding to a color of the color image includes a pattern determination section that determines a hatch pattern having a foreground and a background which serves as a pattern in accordance with a color of a pixel in the color image, a color value determination section that determines a color value of a color material to be assigned to the foreground and the background in the hatch pattern, and an image processing section that replaces the color of the pixel in the color image with a color value of a color material, the color values of the foreground and the background in the hatch pattern are different, and the color value determination section determines the color value of the color material per unit area in the hatch pattern determined such that a chromatic value.

7 Claims, 9 Drawing Sheets

| R | G | B | PATTERN TYPE | \multicolumn{4}{c}{FOREGROUND VALUE} | \multicolumn{4}{c}{BACKGROUND VALUE} |

| R | G | B | PATTERN TYPE | C | M | Y | K | C | M | Y | K |
|---|---|---|---|---|---|---|---|---|---|---|---|
| 255 | 0 | 0 | P1 | 0 | 204 | 204 | 0 | 0 | 255 | 255 | 0 |
| 254 | 0 | 0 | P1 | 0 | 203 | 203 | 0 | 0 | 255 | 255 | 0 |
| ... | ... | ... | ... | ... | ... | ... | ... | ... | ... | ... | ... |
| 128 | 0 | 0 | P1 | 0 | 177 | 177 | 0 | 0 | 121 | 121 | 0 |
| ... | ... | ... | ... | ... | ... | ... | ... | ... | ... | ... | ... |
| 0 | 0 | 239 | P2 | 255 | 255 | 0 | 0 | 232 | 232 | 0 | 0 |
| ... | ... | ... | ... | ... | ... | ... | ... | ... | ... | ... | ... |
| 0 | 0 | 0 | NONE | 0 | 0 | 0 | 255 | 0 | 0 | 0 | 255 |

| R | G | B | PATTERN TYPE | \multicolumn{4}{c}{FOREGROUND VALUE} | \multicolumn{4}{c}{BACKGROUND VALUE} |
|---|---|---|---|---|---|---|---|---|---|---|---|
| | | | | C | M | Y | K | C | M | Y | K |
| 255 | 0 | 0 | P1 | 0 | 255 | 0 | 0 | 0 | 0 | 255 | 0 |
| 254 | 0 | 0 | P1 | 0 | 255 | 0 | 0 | 0 | 0 | 255 | 0 |
| ... | ... | ... | ... | ... | ... | ... | ... | ... | ... | ... | ... |
| 128 | 0 | 0 | P1 | 0 | 0 | 128 | 0 | 0 | 128 | 0 | 0 |
| ... | ... | ... | ... | ... | ... | ... | ... | ... | ... | ... | ... |
| 0 | 0 | 239 | P2 | 0 | 239 | 0 | 0 | 239 | 0 | 0 | 0 |
| ... | ... | ... | ... | ... | ... | ... | ... | ... | ... | ... | ... |
| 0 | 0 | 0 | NONE | 0 | 0 | 0 | 255 | 0 | 0 | 0 | 255 |

IMAGE PROCESSING APPARATUS, IMAGE PROCESSING METHOD, AND PROGRAM

BACKGROUND

1. Technical Field

The present disclosure relates to an image processing apparatus, an image processing method, and a program.

2. Related Art

In a color image, if color regions having similar hues are adjacent to each other, it might be difficult to distinguish a boundary of the color regions. Also, for a person having color vision deficiency who has difficulty in identifying colors, it might be difficult to distinguish a boundary of adjacent color regions, not only when the color regions have similar hues but also when the color regions have very different hues.

There have been known technologies for correcting colors in a color image to make the color image easily viewable even to a user having color vision deficiency. For example, JP-A-2008-235965 describes a technology in which a color correction amount is determined on the basis of information regarding types of color vision characteristics to perform color correction of an input color image, thereby performing proper color correction to make input color image data easily viewable even to a user having color vision deficiency.

According to the technology of JP-A-2008-235965, a color image is corrected to be easily viewable to a user having color vision deficiency, but after color correction, values of color attributes of the color image, such as a hue and a brightness thereof, are changed from those prior to the color correction. Therefore, when a user who does not have color vision deficiency views the color image after the color correction, the color image might give the user a very unnatural impression because the tones of colors in the entire image are changed from those of the color image before the color correction.

SUMMARY

An advantage of some aspects of the present disclosure is to provide a color image whose colors are easily distinguishable not only to a person having color vision deficiency but also to a person who does not have color vision deficiency and which only appears slightly strange.

One embodiment for solving the above described disadvantage is directed to an image processing apparatus for applying to a color image a pattern corresponding to a color of the color image includes a pattern determination section that determines a hatch pattern having a foreground and a background each of which serves as a pattern in accordance with a color of a pixel in the color image, a color value determination section that determines a color value of a color material to be assigned to each of the foreground and the background in the determined hatch pattern in accordance with the color of the pixel in the color image, and an image processing section that replaces the color of the pixel in the color image with a color value of a color material of a corresponding pixel in the determined hatch pattern, the color values of the color materials of the foreground and the background in the hatch pattern are different, and the color value determination section determines the color value of the color material per unit area in the hatch pattern determined by the pattern determination section such that a chromatic value as an attribute of the color of the corresponding pixel in the color image is maintained.

Thus, a color image whose colors are easily distinguishable not only to a person having color vision deficiency but also to a person who does not have color vision deficiency and which only appears slightly strange may be provided.

The chromatic value may be at least one of a brightness, a saturation, and a hue. Thus, the level of change in impression which the color image gives between before and after the hatch pattern is applied may be reduced.

The pattern determination section may assign a single color material to at least one of the foreground and the background of the hatch pattern. Thus, unevenness in adhesion of the color material to a print medium may be reduced, and a desired color may be more authentically reproduced on the print medium.

The pattern determination section may assign color materials having different concentrations to the foreground and the background in the hatch pattern. Thus, the amount of consumption of the color material can be reduced.

The pattern determination section may determine an adhesion density of the color material such that the adhesion densities of the color materials of the foreground and the background in the hatch pattern are different. Thus, the amount of consumption of the color material can be reduced.

The image processing apparatus may further include an input section that receives information indicating a difference in color value between the foreground and the background in the hatch pattern, and the color value determination section may determine the color value of the color material for each of the foreground and the background in the hatch pattern determined by the pattern determination section so that the difference in the color value received by the input section is achieved. Thus, the level of change in impression which the color image gives may be further reduced according to preference of a user.

Another embodiment for solving the above described disadvantage is directed to an image processing method, in an image processing apparatus, for applying to a color image a pattern corresponding to a color of the color image, the image processing apparatus determines a hatch pattern having a foreground and a background each of which serves as a pattern in accordance with a color of a pixel in the color image, determines a color value of a color material to be assigned to each of the foreground and the background in the determined hatch pattern in accordance with the color of the pixel in the color image, and replaces the color of the pixel in the color image with a color value of a color material of a corresponding pixel in the determined hatch pattern, the color values of the color materials of the foreground and the background in the hatch pattern are different, and the image processing apparatus determines, when determining a color value of a color material, the color value of the color material per unit area in the hatch pattern determined when determining a hatch pattern such that a chromatic value as an attribute of the color of the corresponding pixel in the color image is maintained.

Thus, a color image whose colors are easily distinguishable not only to a person having color vision deficiency but also to a person who does not have color vision deficiency and which only appears slightly strange may be provided.

Still another embodiment for solving the above described disadvantage is directed to a program for causing a computer to function as an image processing apparatus for applying to a color image a pattern corresponding to a color of the color image, the program causes the computer to realize a function of determining a hatch pattern having a foreground and a background each of which serves as a pattern in accordance with a color of a pixel in the color image, a function of determining a color value of a color material to be assigned to each of the foreground and the background in the determined hatch pattern in accordance with the color of the pixel in the color image, and a function of replacing the color of the pixel in the color image with a color value of a color material of a corresponding pixel in the determined hatch pattern, the color values of the color materials of the foreground and the background in the hatch pattern are different, and the function of determining a color value of a color material determines the color value of the color material per unit area in the hatch pattern determined by the function of determining a hatch pattern such that a chromatic value as an attribute of the color of the corresponding pixel in the color image is maintained.

Thus, a color image whose colors are easily distinguishable not only to a person having color vision deficiency but also to a person who does not have color vision deficiency and which only appears slightly strange may be provided.

DESCRIPTION OF EXEMPLARY EMBODIMENTS

Embodiments of the present disclosure will be hereinafter described with reference to the accompanying drawings.

Figure 1:
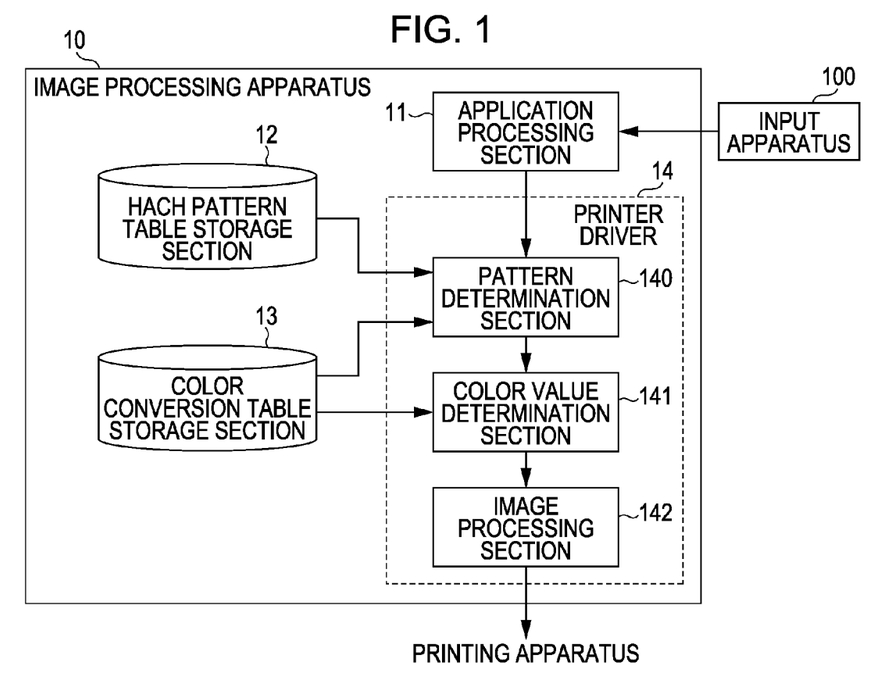
FIG. 1 is a block diagram illustrating an example function structure of an image processing apparatus 10 according to one embodiment of the present disclosure.

FIG. 1 is a block diagram illustrating an example function structure of an image processing apparatus 10 according to an embodiment of the present disclosure. The image processing apparatus 10 includes an application processing section 11, a hatch pattern table storage section 12, a color conversion table storage section 13, and a printer driver 14.

The application processing section 11 receives an instruction from a user of the image processing apparatus 10 via an input apparatus 100 and, in response to the received instruction, generates data of a color image which is to be a print request source to a printing apparatus by a function such as a document composition function and an image editing function, etc. The application processing section 11 sends the generated data of the color image to the printer driver 14.

Figure 2:
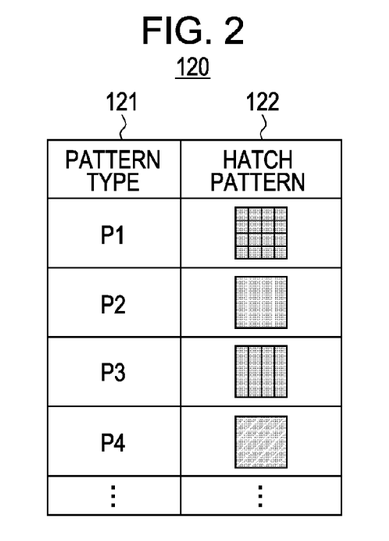
FIG. 2 is a view illustrating an example data structure of a hatch pattern table 120 stored in a hatch pattern table storage portion 12.

In the hatch pattern table storage section 12, for example, a hatch pattern table 120 illustrated in FIG. 2 is stored in advance. Image data representing a hatch pattern 122 is stored in the hatch pattern table 120 in advance in association with a pattern type 121 for identifying each hatch pattern.

Each hatch pattern 122 is an image having a predetermined size of, for example, 32×32 pixels, and contains at least information indicating a background area and a foreground area of an image region of the hatch pattern. A "foreground" in each hatch pattern herein means a pattern such as vertical lines and horizontal lines, etc., and a "background" in each hatch pattern herein means an area serving as a background having some pattern other than that of the foreground.

Figure 3:
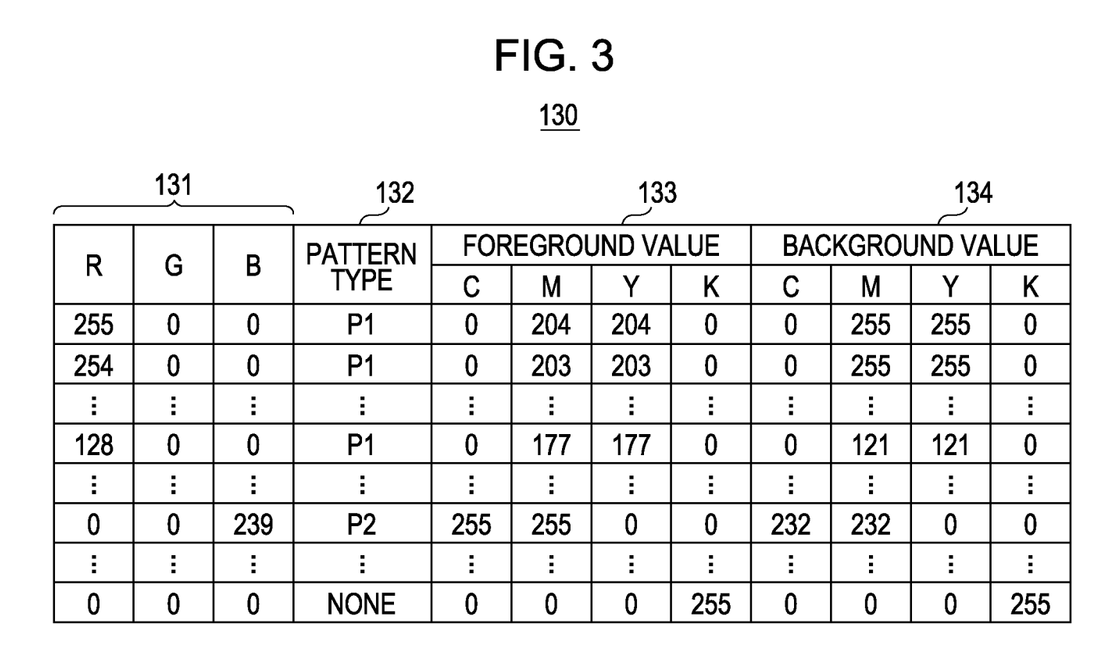
FIG. 3 is a view illustrating an example data structure of a color conversion table 130 stored in a color conversion table storage section 13.

In the color conversion table storage section 13, for example, a color conversion table 130 illustrated in FIG. 3 is stored in advance. The color conversion table 130 includes, in association with an RGB value 131 representing gray-scale values of R (red), G (green), and B (blue) of a pixel of a color image, a pattern type 132 of a hatch pattern which is to be assigned to each pixel having the gray-scale values, a foreground value 133 representing color values of color materials used for the foreground of the hatch pattern, and a background value 134 representing color values of color materials used for the background of the hatch pattern stored in advance.

Note that in this embodiment, the RGB value 131 of the color image represents respective gray-scale values of R (red), G (green), and B (blue) with 8 bits and 256 gradations of 0 to 255. For the foreground value 133 and the background value 134, respective color values of color materials of C (cyan), M (magenta), Y (yellow), and K (black) are represented with 8 bits and 256 gradations of 0 to 255.

In this embodiment, the same color materials are assigned to the foreground and the background. A difference in color value between the foreground and the background is set as a difference in adhesion density per unit area of a color material adhered to a print medium. That is, one of the foreground and the background which has a higher color value has a higher adhesion density of the assigned color material adhered to the print medium.

In addition, in this embodiment, even when, in addition to the color materials of C (cyan), M (magenta), Y (yellow), and K (black), for example, $L_C$ (light cyan) and $L_M$ (light magenta) which are color materials of pale colors are used, in part of a hatch pattern which has a low concentration, C (cyan), M (magenta), Y (yellow), and K (black) which are normal color materials are adhered to a print medium in low density, while $L_C$ (light cyan) and $L_M$ (light magenta) are used as little as possible. Thus, the amount of the color materials consumed may be reduced.

In this case, the color conversion table 130 illustrated in FIG. 3 is set in advance so as to meet the following requirements.

Figure 4:
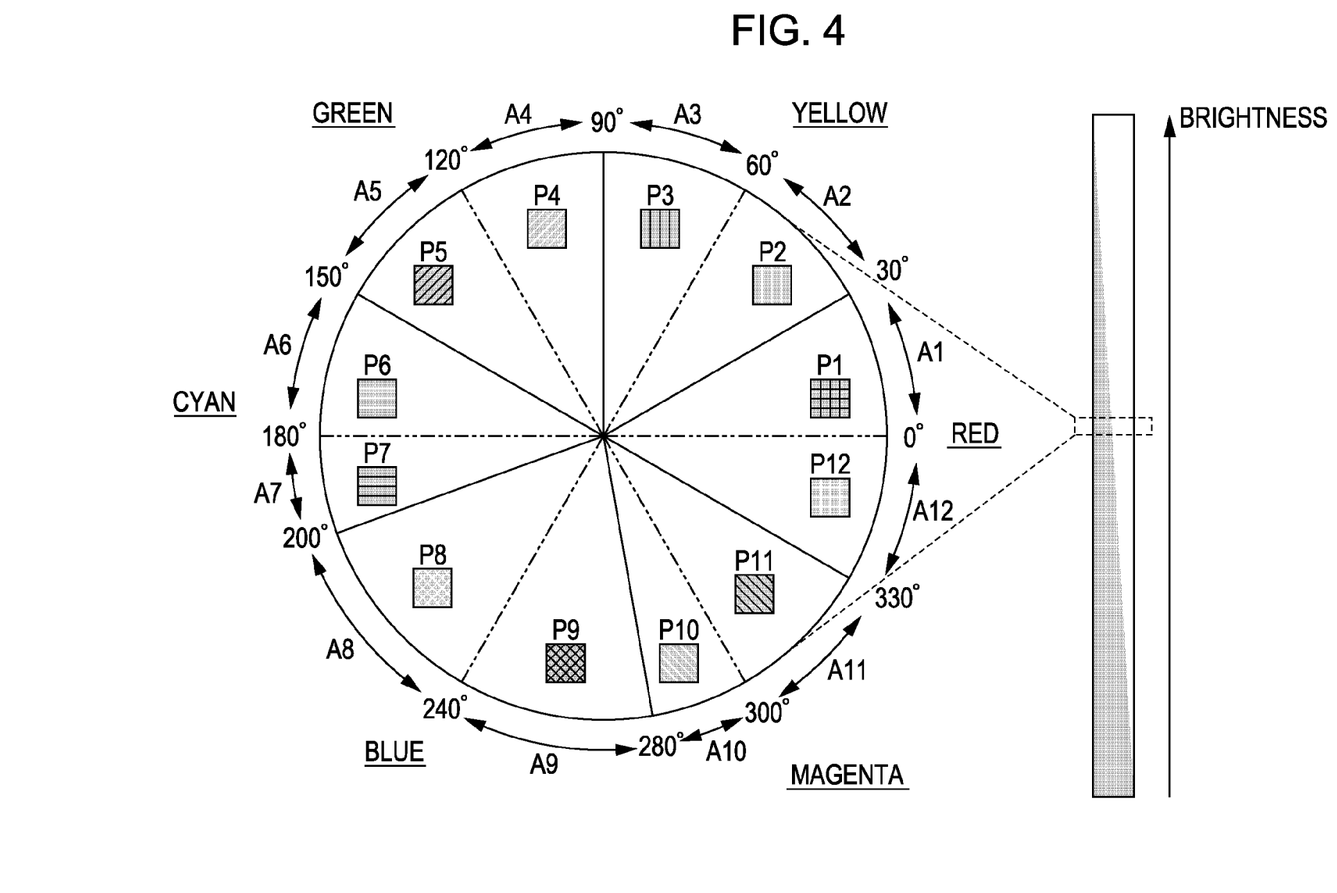
FIG. 4 is a conceptual view illustrating an example correspondence between hues on color hue circle and hatch patterns.

(1) Requirement regarding assignment of hatch pattern according to hue
(2) Requirement regarding change in background concentration according to brightness
(3) Requirement regarding linear density of hatch pattern according to brightness
(4) Requirement regarding assignment of hatch pattern for colors in complementary color relationship
(5) Requirement regarding assignment of hatch pattern for colors of adjacent color regions (1) Requirement Regarding Assignment of Hatch Pattern According to Hue A hatch pattern which has been determined in advance is assigned to each of color regions into which a color hue circle is divided according to hues. FIG. 4 illustrates an example correspondence between hues on the color hue circle and hatch patterns. In the example of FIG. 4, the hues on the color hue circle are divided into color regions A1 to A12 and hatch patterns P1 to P12 are assigned to the color regions A1 to A12, respectively.

Note that the color regions A1 and A12 correspond to colors of the red color group, the color region A1 corresponds to a hue angle of 0 degrees or more and less than 30 degrees, and the color region A12 corresponds to a hue angle of 330 degrees or more and less than 360 degrees. The color regions A2 and A3 correspond to colors of the yellow color group, the color region A2 corresponds to a hue angle of 30 degrees or more and less than 60 degrees, and the color region A3 corresponds to a hue angle of 60 degrees or more and less than 90 degrees.

The color regions A4 and A5 correspond to colors of the green color group, the color region A4 corresponds to a hue angle of 90 degrees or more and less than 120 degrees, and the color region A5 corresponds to a hue angle of 120 degrees or more and less than 150 degrees. The color regions A6 and A7 correspond to colors of the cyan color group, the color region A6 corresponds to a hue angle of 150 degrees or more and less than 180 degrees, and the color region A7 corresponds to a hue angle of 180 degrees or more and less than 200 degrees.

The color regions A8 and A9 corresponds to colors of the blue color group, the color region A8 corresponds to a hue angle of 200 degrees or more and less than 240 degrees, and the color region A9 corresponds to a hue angle of 240 degrees or more and less than 280 degrees. The color regions A10 and A11 correspond to colors of the magenta color group, the color region A10 corresponds to a hue angle of 280 degrees or more and less than 300 degrees, and the color region A11 corresponds to a hue angle of 300 degrees or more and less than 330 degrees.

Thus, data of a color image to which a pattern hatching according to hues of the color image is performed may be generated. Therefore, even for regions which are difficult to distinguish from each other on the basis of only a difference between colors of the color image, a color image in which the regions can be recognized as regions with different colors applied thereto on the basis of a difference in hatch pattern may be printed.

(2) Requirement Regarding Change in Background Concentration According to Brightness A color value of each color material of a background and a foreground of a hatch pattern in a unit region is set so that the average brightness on the basis of the RGB value in a unit region of a color image before applying the hatch pattern thereto is equal to the average brightness in the unit region after applying the hatch pattern.

That is, for the hatch pattern in the unit region, the brightness obtained when averaging the RGB value of the color image in the unit region is equal to the brightness obtained when averaging the C value, M value, Y value, and K value of color materials of the hatch pattern in the unit region. Note that "the former brightness is equal to the latter brightness" means that the former brightness is substantially equal to the latter brightness, but is not limited to the former brightness being exactly the same as the latter brightness, and thus also includes a case where the former brightness is slightly different from the latter brightness at a level where a person feels that they are equal when viewing the color image.

Thus, when data of the color image is converted to data of the color image with hatch patterns applied thereto, the brightness is stored for each unit region in which a hatch pattern is applied. For example, when the brightness of the color image changes in the vertical direction as illustrated on the right side of FIG. 4, the brightness of the color image in which a hatch pattern is applied to each unit region changes following the change in brightness of the color image. Therefore, the change in brightness of the color image is maintained also in the color image with hatch patterns applied thereto, so that even the color image with hatch patterns applied thereto may only appear slightly strange.

(3) Requirement Regarding Linear Density of Hatch Pattern According to Brightness The brightness of each color on the color hue circle and a linear density of a pattern (foreground) of a corresponding hatch pattern are set so that the linear density changes following change in brightness. For example, as illustrated in the yellow color region A3 and the red color region A1 in FIG. 4, a foreground with "vertical lines" is assigned to the yellow color region A3, and a foreground with "grid lines" including horizontal lines as well as vertical lines is assigned to the red color region A1.

That is, a hatch pattern P with a higher line density is assigned to red whose brightness is lower than that of yellow. Thus, the difference in brightness in the original color image is changed into a difference in linear density of the hatch pattern P and is reflected in an image with the hatch pattern applied thereto. Therefore, an impression closer to that of the original color image may be given to a user who views the image with the hatch pattern applied thereto.

(4) Requirement Regarding Assignment of Hatch Pattern to Colors in Complementary Color Relationship For two colors in a complementary color relationship, setting is performed such that hatch patterns are assigned so as to satisfy a relationship in which one of the hatch patterns is rotated with respect to the other, i.e., only the angles of the hatch patterns are different from each other.

For example, in the example illustrated in FIG. 4, a hatch pattern P5 corresponding to the hue angle of 120 degrees to 150 degrees has a pattern including diagonal lines each extending from the lower right to the upper left. On the other hand, a hatch pattern P11 corresponding to a hue angle of 300 degrees to 330 degrees, which is in a complementary color relationship with the hatch pattern P5, has a pattern including diagonal lines each extending from the upper left to the lower right.

Thus, for colors in a complementary color relationship, setting is performed such that hatch patterns are assigned so as to satisfy a relationship in which one of the hatch patterns matches the other one after rotation. Therefore, for two colors in a complementary color relationship in the original color image, the complementary color relationship of the two colors is reflected in the color image with hatch patterns applied thereto. Thus, a user who views the image with hatch patterns applied thereto may recognize from the image with the hatch patterns applied thereto that the two colors in the original image are in a complementary color relationship.

Note that in this embodiment, as illustrated in FIG. 4, the requirement (4) is not applied to all of the color regions A1 to A12 but is applied only to the color regions A4 and A10 in a complementary color relationship and the color regions A5 and A11 in a complementary color relationship. However, the requirement (4) may be applied to all of the color regions in a complementary color relationship.

(5) Requirement Regarding Assignment of Hatch Pattern to Colors of Adjacent Color Regions For two color regions adjacent to each other, setting is performed such that a foreground of a hatch pattern corresponding to one of the two color regions has a lower concentration than that of a background thereof and a foreground of a hatch pattern corresponding to the other one of the two color regions has a higher concentration than that of a background thereof.

In the example illustrated in FIG. 4, for example, a hatch pattern P1 corresponding to the color region A1 having a hue angle of 0 degrees to 30 degrees includes a foreground with "grid lines" having a higher concentration than that of a background thereof, and the concentration of lines of the foreground is set such that the foreground is closer to black, as compared to the background.

On the other hand, a hatch pattern P12 corresponding to the same red color group as the color region A1 and also corresponding to a hue angle of 330 degrees to 360 degrees of the color region A12 adjacent to the color region A1 includes a foreground with "grid lines" having a lower concentration than that of a background thereof, and the concentration of lines of the foreground is set such that the foreground is closer to write, as compared to the background.

Thus, for colors of adjacent color regions, the relationship between the concentrations of the foreground and the background for one of the colors is inversed for the other one of the colors, and thereby, the difference between the two colors of the adjacent color regions is reflected in the color image with hatch patterns applied thereto. Therefore, even for two colors of adjacent color regions, which are indistinguishable in the color image, the difference between the two colors may be made apparent in the image with hatch patterns applied thereto.

Returning to FIG. 1, the description will be continued. The printer driver 14 generates, on the basis of a print request and data of the color image received from the application processing section 11, print data in a data format in which a printing apparatus such as a printer and a complex machine, etc. can process the print data. Then, the printer driver 14 sends the generated print data to the printing apparatus to cause the printing apparatus to execute printing.

The printer driver 14 includes a pattern determination section 140, a color value determination section 141, and an image processing section 142.

When the pattern determination section 140 receives the data of the color image from the application processing section 11, the pattern determination section 140 refers, for each pixel in the color image, to the color conversion table 130 in the color conversion table storage section 13 on the basis of the RGB value of the pixel to specify a pattern type of a hatch pattern corresponding to the RGB value of the pixel.

In the example color conversion table 130 illustrated in FIG. 3, when the RGB value of a pixel-in-attention is (R, G, B)=(128, 0, 0), the pattern determination section 140 specifies "P1" as the pattern type.

Then, the pattern determination section 140 refers to the hatch pattern table 120 in the hatch pattern table storage section 12 on the basis of the specified pattern type to specify image data of the hatch pattern. When the color image received from the application processing section 11 is tiled with the specified image data of the hatch pattern, the pattern determination section 140 specifies a pixel in the hatch pattern corresponding to the pixel-in-attention.

Figure 5A:
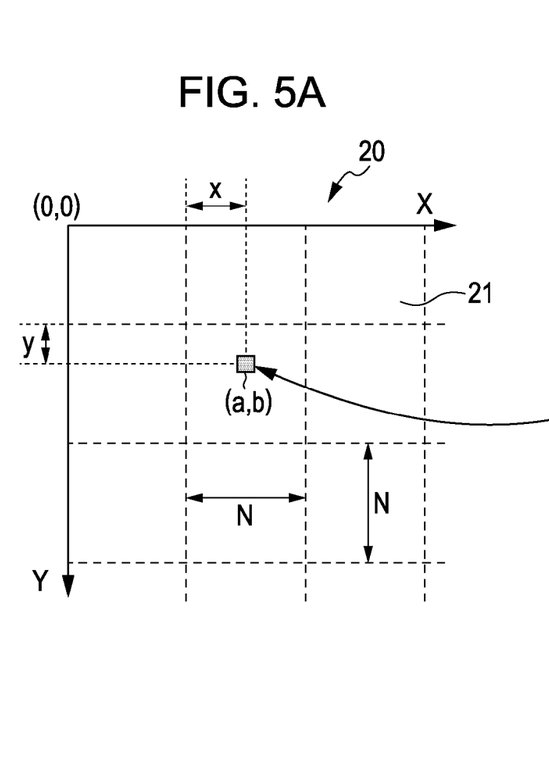
FIGS. 5A and 5B are conceptual views illustrating assignment of a hatch pattern to a pixel-in-attention.
Figure 5B:
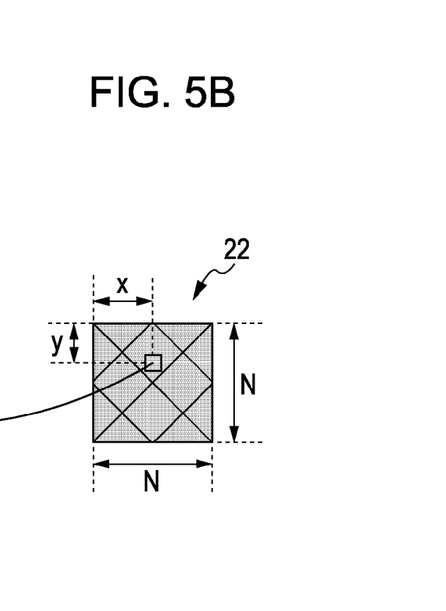

For example, as illustrated in FIGS. 5A and 5B, assuming that coordinates of a pixel-in-attention on a color image 20 received from the application processing section 11 is (a, b) and each hatch pattern 22 has a size of N×N pixels, a relative coordinates (x, y) of the pixel-in-attention in a unit region 21 are obtained on the basis of the following expressions (1) and (2). Note that in the following expressions, "mod" is an operator to return the reminder after division.

$$X = a \bmod N \quad \text{[Expression 1]}$$

$$Y = b \bmod N \quad \text{[Expression 2]}$$

Then, the pattern determination section 140 determines, on the basis of the image data of the hatch pattern specified in the hatch pattern table 120 and the calculated relative coordinates (x, y) of the pixel-in-attention, whether the pixel-in-attention corresponds to a background or a foreground in the hatch pattern.

Then, the pattern determination section 140 sends a result of the determination (the foreground or the background), the RGB value of the pixel-in-attention and the coordinate values ((a, b) in the example of FIG. 5A) of the pixel-in-attention to the color value determination section 141. When all pixels on the color image received from the application processing section 11 are selected as pixels-in-attention, the pattern determination section 140 sends a notice of end to the color value determination section 141.

When the color value determination section 141 receives the result of the determination of the foreground or the background, the RGB value of the pixel-in-attention, and the coordinate values of the pixel-in-attention from the pattern determination section 140, the color value determination section 141 refers to the color conversion table 130 in the color conversion table storage section 13 on the basis of the RGB value of the pixel-in-attention to specify a foreground value and a background value given in association with the RGB value.

If the result of the determination by the pattern determination section 140 is the "foreground," the color value determination section 141 specifies, as color values of color materials of the pixel-in-attention, color values of color materials given for the foreground value which is one of the specified foreground value and background value.

If the result of the determination by the pattern determination section 140 is the "background," the color value determination section 141 specifies, as color values of color materials of the pixel-in-attention, color values of color materials given for the background value which is one of the specified foreground value and background value.

Then, the color value determination section 141 sends information for the specified color values of color materials with the coordinate values ((a, b) in the example of FIG. 5A) of the pixel-in-attention to the image processing section 142. In the case where the information for the specified color values of color materials and the coordinate values for all pixels-in-attentions received from the pattern determination section 140 are sent to the image processing section 142, the color value determination section 141 sends a notice of end to the image processing section 142.

When the image processing section 142 receives the information for the color values of color materials and the coordinate values for each pixel-in-attention from the color value determination section 141, the image processing section 142 holds the received information and coordinates. When the image processing section 142 receives a notice of end from the color value determination section 141, the image processing section 142 puts the information for the color values of color materials for each pixel-in-attention received from the color value determination section 141 in corresponding coordinates of the pixel to generate print data, and sends the generated print data to the printing apparatus.

Figure 6:
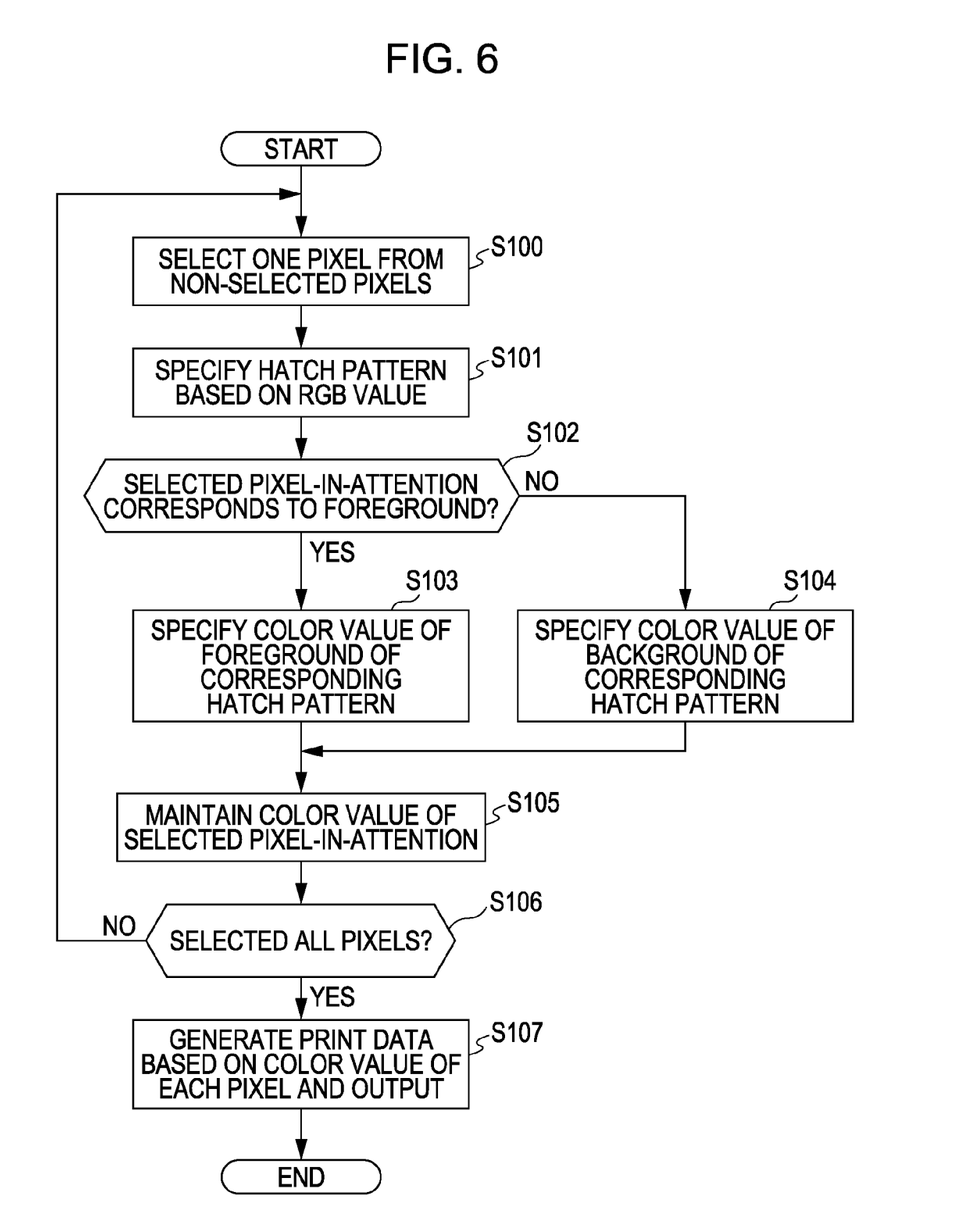
FIG. 6 is a flowchart illustrating an example operation of the image processing device 10.

FIG. 6 is a flowchart illustrating an example operation of the image processing device 10. When the application processing section 11 generates data of a color image and sends the generated data to the printer driver 14, the image processing apparatus 10 starts the operation illustrated in this flowchart.

First, the pattern determination section 140 selects, as a pixel-in-attention, one of non-selected pixels in a color image received from the application processing section 11 (S100). Then, the pattern determination section 140 refers to the color conversion table 130 in the color conversion table storage section 13 on the basis of the RGB value of the selected pixel-in-attention and specifies the pattern type of a hatch pattern corresponding to the RGB value.

Next, the pattern determination section 140 refers to the hatch pattern table 120 in the hatch pattern table storage section 12 on the basis of the specified pattern type to specify image data of the hatch pattern (S101). When the color image received from the application processing section 11 is tiled with the specified image data of the hatch pattern, the pattern determination section 140 specifies relative coordinates of a pixel in the hatch pattern corresponding to the pixel-in-attention.

The pattern determination section 140 determines, on the basis of the image data of the hatch pattern specified in the hatch pattern table 120 and the specified relative coordinates of the pixel-in-attention, whether the pixel-in-attention corresponds to a foreground or a background in the hatch pattern (S102).

If the pixel-in-attention corresponds to the foreground of the hatch pattern (YES in S102), the pattern determination section 140 sends the result of the determination that the pixel-in-attention corresponds to the foreground, the RGB value of the pixel-in-attention, and the coordinate values of the pixel-in-attention to the color value determination section 141.

The color value determination section 141 refers to the color conversion table 130 in the color conversion table storage section 13 on the basis of the RGB value of the pixel-in-attention received from the pattern determination section 140 to specify, as color values of color materials of the pixel-in-attention, color values of color materials given for the foreground value in association with the RGB value (S103).

Then, the color value determination section 141 sends information for the specified color values of color materials with the coordinate values of the pixel-in-attention to the image processing section 142. The image processing section 142 executes processing described in Step S105.

On the other hand, if the pixel-in-attention corresponds to the background in the hatch pattern (NO in S102), the pattern determination section 140 sends the result of the determination that the pixel-in-attention corresponds to the background, the RGB value of the pixel-in-attention, and the coordinates of the pixel-in-attention to the color value determination section 141.

The color value determination section 141 refers to the color conversion table 130 in the color conversion table storage section 13 on the basis of the RGB value of the pixel-in-attention received from the pattern determination section 140 to specify, as color values of color materials of the pixel-in-attention, color values of color materials given for the background value in association with the RGB value (S104).

Next, the color value determination section 141 sends information for the specified color values of color materials with the coordinate values of the pixel-in-attention to the image processing section 142. The image processing section 142 holds the information for the color values of color materials received from the color value determination section 141 with the coordinate values of the pixel-in-attention (S105).

Next, the pattern determination section 140 determines whether all pixels on the color image received from the application processing section 11 are selected as pixels-in-attention (S106). If a non-selected pixel exists in the color image (NO in S106), the pattern determination section 140 executes the processing illustrated in Step S100 again.

On the other hand, if the all pixels on the color image received from the application processing section 11 are selected as pixels-in-attention (YES in S106), the pattern determination section 140 sends a notice of end to the color value determination section 141. In the case where the information of the color values of color materials for all pixels-in-attention and the coordinate values which have been received from the pattern determination section 140 during a period until the notice of end is sent from the pattern determination section 140 are sent to the image processing section 142, the color value determination section 141 sends a notice of end to the image processing section 142.

When the notice of end is sent to the image processing section 142 from the color value determination section 141, the image processing section 142 puts the information for the color values of color materials for each pixel-in-attention received from the color value determination section 141 in corresponding coordinates to generate print data and outputs the generated print data to the printing apparatus (S107). Thus, the printing apparatus executes printing of the print data generated by the image processing apparatus 10.

Figure 7:
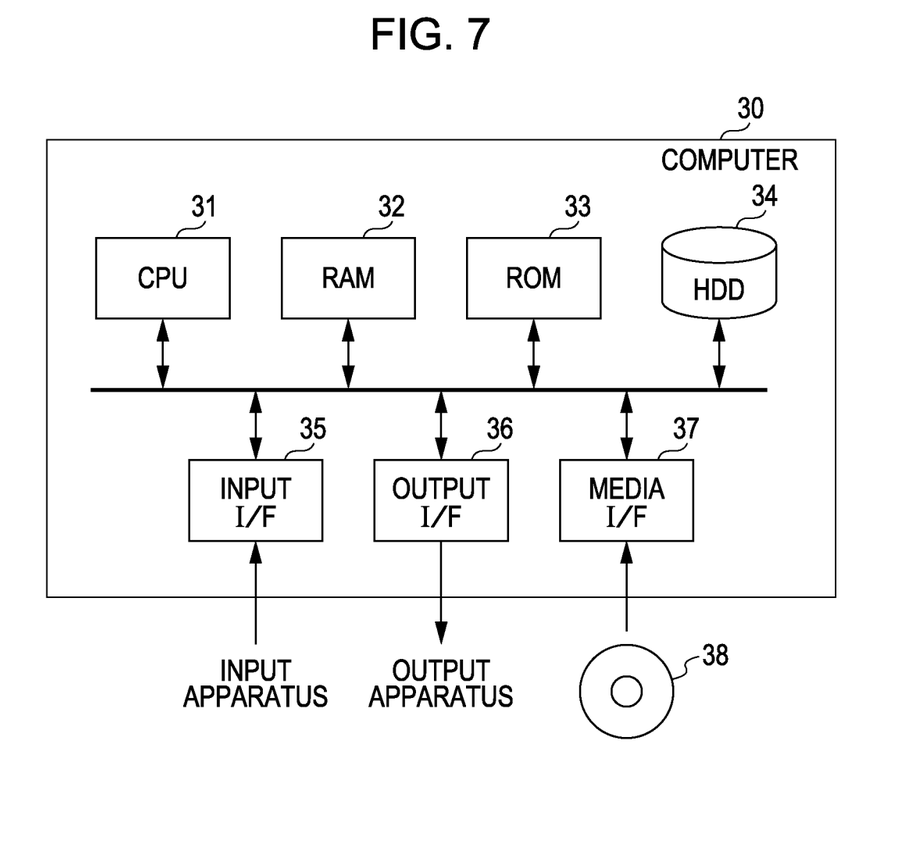
FIG. 7 is a diagram illustrating an example hardware structure of a computer 30 to realize a function of the image processing apparatus 10.

Note that the image processing apparatus 10 is realized, for example, by a computer 30 illustrated in FIG. 7. FIG. 7 is a view illustrating an example hardware structure of the computer 30 to realize the function of the image processing apparatus 10.

The computer 30 includes a central processing unit (CPU) 31, a random access memory (RAM) 32, a read only memory (ROM) 33, a hard disk drive (HDD) 34, an input interface (I/F) 35, an output interface (I/F) 36, and a media interface (I/F) 37.

The CPU 31 is operated on the basis of a program stored in the ROM 33 or the HDD 34 to perform control of each section. The ROM 33 stores a boot program to be executed by the CPU 31 at the time of start up of the computer 30 and a program dependent on a hardware of the computer 30, etc.

The HDD 34 stores a program to be executed by the CPU 31 and data to be used by the program, etc. The CPU 31 obtains data from an input apparatus such as a keyboard and a mouse via the input interface 35. Also, the CPU 31 outputs generated data to an output apparatus such as a display apparatus or the printing apparatus, etc., via the output interface 36.

The media interface 37 reads out a program or data stored in a storage medium 38 and provides the program or the data to the CPU 31 via the RAM 32. The CPU 31 loads the program or the data from the storage medium 38 onto the RAM 32 via the media interface 37 and executes the loaded program. The storage medium 38 is, for example, an optical recording medium such as a digital versatile disc (DVD) and a phase change rewritable disk (PD), etc., a magneto-optical recording medium such as magneto-optical disk (MO), a tape medium, a magnetic recording medium, or a semiconductor memory, etc.

The CPU 31 of the computer 30 executes programs loaded onto the RAM 32 to realize functions of the application processing section 11, the pattern determination section 140, the color value determination section 141, and the image processing section 142. Data in the hatch pattern table storage section 12 and the color conversion table storage section 13 is stored in the ROM 33 or the HDD 34.

The CPU 31 of the computer 30 reads out these programs from the storage medium 38 to execute them. As another example, these programs may be obtained from some other apparatus via a communication line.

Embodiments of the present disclosure have been described above.

As clearly understood from the foregoing description, the image processing apparatus 10 of this embodiment may provide a color image whose colors are easily distinguishable not only to a person having color vision deficiency but also to a person who does not have color vision deficiency and which only appears slightly strange.

Note that the present disclosure is not limited to the above-described embodiments but may include various modifications.

For example, in the above embodiment, as has been described with reference to FIG. 3, the foreground value and the background value in the color conversion table 130 are set in advance so that different color values are given thereto while the same color materials are used. However, the present disclosure is not limited thereto.

Figure 8:
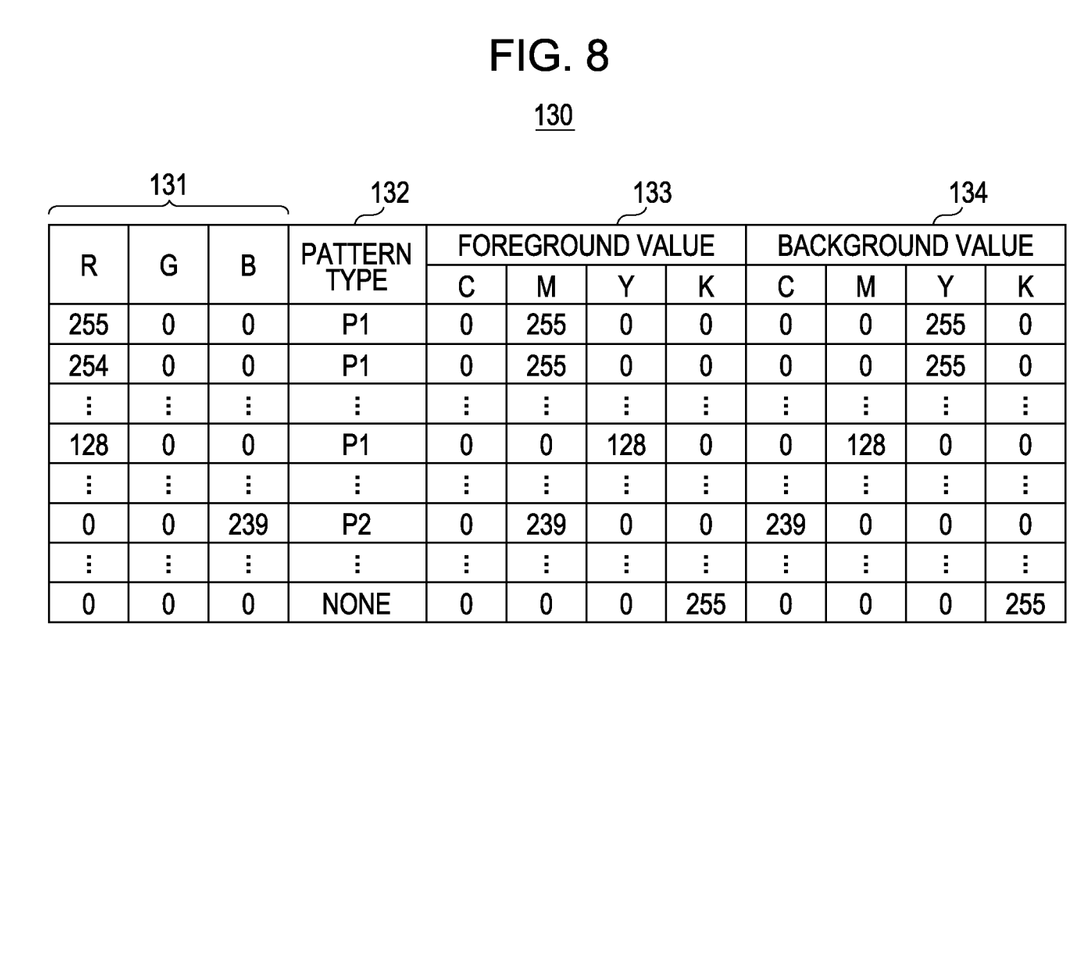
FIG. 8 is a view illustrating another example data structure of the color conversion table 130 stored in the color conversion table storage section 13.

In a hatch pattern, as long as the brightness of a pixel-in-attention is maintained in a unit region including a foreground and a background, a single color material may be assigned to at least one of the foreground and the background in the color conversion table 130, as illustrated in FIG. 8.

Figure 9:
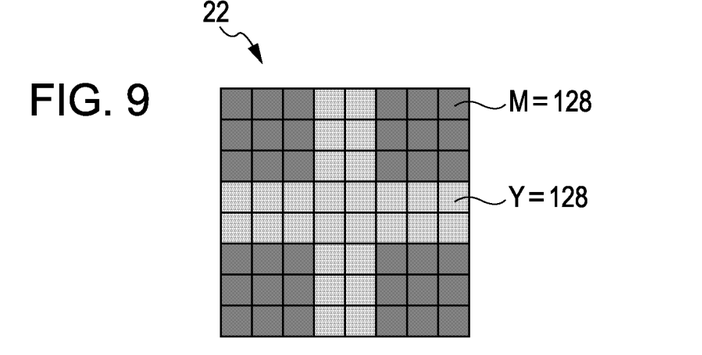
FIG. 9 is a conceptual view illustrating another example hatch pattern.

In the example color conversion table 130 illustrated in FIG. 8, for the hatch pattern corresponding to the pixel of (R, G, B)=(128, 0, 0), for example, as illustrated in FIG. 9, 128 of Y (yellow) is assigned to the foreground of grid lines, and 128 of M (magenta) is assigned to the background. Thus, unevenness in adhesion of a color material to a print medium may be reduced, and a desired color may be more authentically reproduced on the print medium.

In the example color conversion table 130 illustrated in FIG. 3, the same color materials are used for the foreground and the background. For example, when $L_C$ (light cyan) and $L_M$ (light magenta) which are color materials of pale colors are used in addition to normal color materials of C (cyan), M (magenta), Y (yellow), and K (black), the color materials of pale colors may be assigned to one of the foreground and the background and the color materials of the normal colors may be assigned to the other one of the foreground and the background, as illustrated in FIG. 10.

Figure 10:
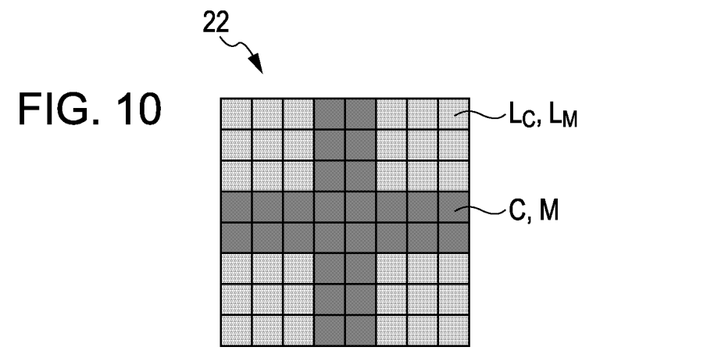
FIG. 10 is a conceptual view illustrating still another example hatch pattern.

In the example of FIG. 10, C (cyan) and M (magenta) which are normal color materials are assigned to the foreground to serve as grid lines of the hatch pattern, and $L_C$ (light cyan) and $L_M$ (light magenta) are assigned to the background. Thus, the amount of consumption of the color materials may be reduced.

According to the above embodiment, the hatch pattern is described to include two layers of the foreground and the background. However, the present disclosure is not limited thereto. For example, the hatch pattern may be divided into n layers, a single color material may be assigned to each of the layers, and an adhesion density of each color material may be set so that the brightness of a pixel of the original color image is maintained in the entire hatch patterns.

Figure 11:
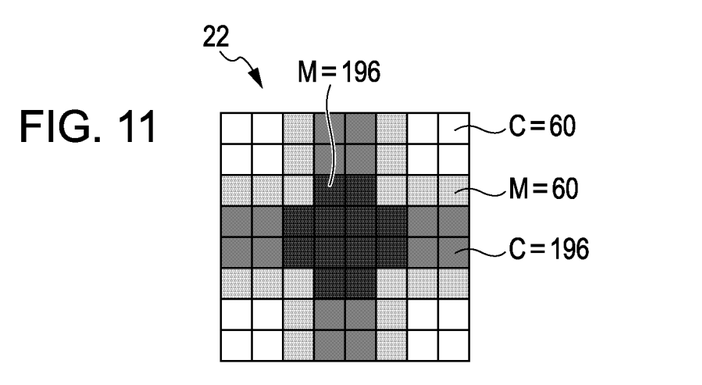
FIG. 11 is a conceptual view illustrating still another example hatch pattern.

FIG. 11 illustrates an example in which a hatch pattern is divided into 4 layers. The hatch pattern of FIG. 11 includes 8×8 pixels. The hatch pattern of FIG. 11 is configured to include a first layer in which C (cyan) having a color value of 60 is arranged in four corners of the hatch pattern, a second layer in which M (magenta) having a color value of 60 is arranged in an L shape so as to surround each region in which the color material is arranged in the first layer, a third layer in which C (cyan) having a color value of 196 is arranged in upper, lower, left, and right end portions of cross-shaped center part of the hatch pattern, and a fourth layer in which M (magenta) having a color value of 196 is arranged in a center portion of the cross-shaped center part of the hatch pattern.

As described above, color materials are concentrated in a single region, and thus, in a printing apparatus, such as a laser printer, of a type in which color materials are electro-statically picked up and adhered to a print medium, variations in the amount of the adhered color materials may be reduced and a desired color on the print medium may be more authentically reproduced.

In the FIG. 3 in the above embodiment, for the difference in color value between the foreground and the background, color values of color materials are set, while the brightness of the pixel having the corresponding RGB value is maintained, so that the lower one of the color values of the foreground and the background is about 80% of the higher one thereof. However, the difference in color value between the foreground and the background is not limited thereto.

Figure 12:
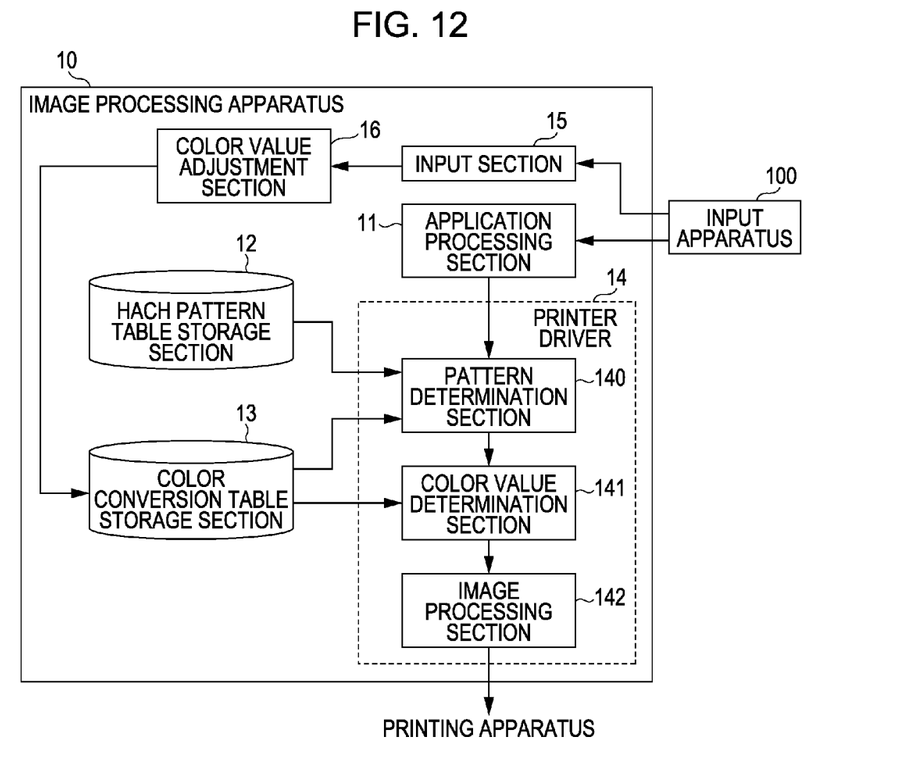
FIG. 12 is a block diagram illustrating another example function structure of the image processing apparatus 10.

In addition, for example, as illustrated in FIG. 12, an input section 15 that receives information indicating a difference in color value from a user, and a color value adjustment section 16 that recalculates, while maintaining the brightness of the pixel having the corresponding RGB value, color values in all combination of the foreground and the background in the color conversion table 130 so that the difference in color value received by the input section 15 is achieved and updates the color values in the color conversion table 130 may be further provided in the image processing apparatus 10. Thus, the level of change in impression which the color image gives may be adjusted to be further reduced according to preference of an individual user.

Figure 13A:
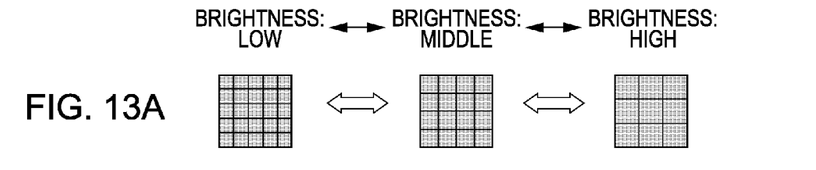
FIGS. 13A and 13B are conceptual views illustrating example settings for linear density corresponding to chrome saturation.
Figure 13B:
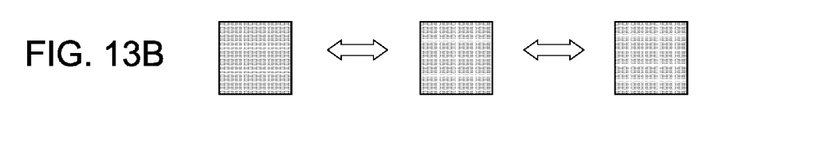

In addition, for example, as illustrated in FIGS. 13A and 13B, the type of the hatch pattern may be determined according to a saturation. In the case where the concentration in the foreground is higher than the concentration in the background, for example, as illustrated in FIG. 13A, when the saturation of the color image is high, the linear density of the foreground is set to be low. On the other hand, in the case where the concentration in the foreground is lower than the concentration in the background, for example, as illustrated in FIG. 13B, when the saturation of the color image is high, the linear density of the foreground is set to be high. Thus, the saturation of the color image is reflected in an image with hatch patterns applied thereto, and accordingly, the difference in saturation in the original image may be clearly distinguished also in the image with hatch patterns applied thereto.

In addition, in the above embodiment, for all pixels in the color image created by the application processing section 11, a hatch pattern to be assigned is determined. However, the present disclosure is not limited thereto. The image processing apparatus 10 may be operated so that a hatch pattern is not applied to a color image such as a photograph to which it is more preferable not to apply hatch patterns.

Even for some color image other than a photograph, the image processing apparatus 10 may be operated so that a hatch pattern is not applied to a region which includes a character and the like in the color image and in which a user who creates an image inhibits application of a hatch pattern.

In addition, in the above embodiment, the color value determination section 141 refers to the color conversion table 130 including the information for the color values of color materials calculated in advance so that the brightness of the RGB value is maintained and specifies the color values of the pixel-in-attention. However, the present disclosure is not limited thereto, but the color value determination section 141 may be configured to calculate, by performing an operation each time, the color values of color materials corresponding to the RGB value of the pixel-in-attention so that the brightness of the pixel-in-attention is maintained.

Note that in the above embodiment, the hatch pattern table storage section 12, the color conversion table storage section 13, and the printer driver 14 are provided in the image processing apparatus 10. However, the present disclosure is not limited thereto. Functions corresponding thereto may be provided in a printing apparatus side to generate print data of a color image with hatch patterns applied thereto from data of a color image received from the image processing apparatus 10 and perform printing.

The present disclosure has been described with reference to embodiments but the technical scope of the present disclosure is not limited to a scope described in the above embodiment. It will be understood by those skilled in the art that various changes and modifications of the above embodiment may be made. It is to be clearly understood that embodiments of the present disclosure to which such changes and modifications have been made are encompassed by the technical scope of the present invention defined by the claims.

The entire disclosure of Japanese Patent Application No. 2012-034858, filed Feb. 21, 2012 is expressly incorporated by reference herein.

What is claimed is:

1. An image processing apparatus for applying to a color image a pattern corresponding to a color of the color image, the apparatus comprising:
a pattern determination section that determines a hatch pattern having a foreground and a background each of which serves as a pattern in accordance with a color of a pixel in the color image;
a color value determination section that determines a color value of a color material to be assigned to each of the foreground and the background in the determined hatch pattern in accordance with the color of the pixel in the color image; and
an image processing section that replaces the color of the pixel in the color image with a color value of a color material of a corresponding pixel in the determined hatch pattern,
wherein
the color values of the color materials of the foreground and the background in the hatch pattern are different, and
the color value determination section determines the color value of the color material per unit area in the hatch pattern determined by the pattern determination section such that a chromatic value as an attribute of the color of the corresponding pixel in the color image is maintained,
wherein the pattern determination section determines an adhesion density of the color material such that the adhesion densities of the color materials of the foreground and the background in the hatch pattern are different.

2. The image processing apparatus according to claim 1, wherein the chromatic value is at least one of a brightness, a saturation, and a hue.

3. The image processing apparatus according to claim 1, wherein the pattern determination section assigns a single color material to at least one of the foreground and the background of the hatch pattern.

4. The image processing apparatus according to claim 1, wherein the pattern determination section assigns color materials having different concentrations to the foreground and the background in the hatch pattern.

5. The image processing apparatus according to claim 1, further comprising:
an input section that receives information indicating a difference in color value between the foreground and the background in the hatch pattern,
wherein the color value determination section determines the color value of the color material for each of the foreground and the background in the hatch pattern determined by the pattern determination section such that the difference in the color value received by the input section is achieved.

6. An image processing method, in an image processing apparatus, for applying to a color image a pattern corresponding to a color of the color image,
wherein the image processing apparatus
determines a hatch pattern having a foreground and a background each of which serves as a pattern in accordance with a color of a pixel in the color image,
determines a color value of a color material to be assigned to each of the foreground and the background in the determined hatch pattern in accordance with the color of the pixel in the color image, and
replaces the color of the pixel in the color image with a color value of a color material of a corresponding pixel in the determined hatch pattern,
the color values of the color materials of the foreground and the background in the hatch pattern are different, and
the image processing apparatus determines, when determining a color value of a color material, the color value of the color material per unit area in the hatch pattern determined when determining a hatch pattern such that a chromatic value as an attribute of the color of the corresponding pixel in the color image is maintained,
wherein determining the hatch pattern comprises determining an adhesion density of the color material such that the adhesion densities of the color materials of the foreground and the background in the hatch pattern are different.

7. A non-transitory storage medium which causes a computer to function as,
a pattern determination section that determines a hatch pattern having a foreground and a background each of which serves as a pattern in accordance with a color of a pixel in the color image;
a color value determination section that determines a color value of a color material to be assigned to each of the foreground and the background in the determined hatch pattern in accordance with the color of the pixel in the color image; and
an image processing section that replaces the color of the pixel in the color image with a color value of a color material of a corresponding pixel in the determined hatch pattern,
wherein
the color values of the color materials of the foreground and the background in the hatch pattern are different, and
the color value determination section determines the color value of the color material per unit area in the hatch pattern determined by the pattern determination section such that a chromatic value as an attribute of the color of the corresponding pixel in the color image is maintained, wherein the pattern determination section determines an adhesion density of the color material such that the adhesion densities of the color materials of the foreground and the background in the hatch pattern are different.

* * * * *